Patented Sept. 17, 1935

2,014,676

UNITED STATES PATENT OFFICE 2,014,676

GERMICIDE

Lyle A. Weed, Iowa City, Iowa, assignor to The Hamilton Laboratories, Inc., Hamilton, Ohio, a corporation of Delaware No Drawing. Application November 19, 1934, Serial No. 753,786

9 Claims. (Cl. 167—71)

This invention relates to germicides suitable for internal and external medication and to methods of destroying, in the presence of living tissue, micro-organisms which are pathogenic to man or higher animals but without harming the tissue.

The germicidal pharmaceutical preparations embraced in the present invention are organic mercury compounds in which the mercury atom it attached by one valence to a carbon atom of a benzene ring and by the other to an atom or radical which forms an anion when the compound is dissolved in water. These compounds ionize in aqueous solution in such a manner that the mercury atom forms a part of the positively charged ion or cation. It is possible that their unusual effectiveness against bacteria is due to this fact, since bacteria carry a negative charge which promotes the adsorption of cations. Generically, these organic mercury compounds may be represented by the formula, R-Hg-X, wherein R represents a phenyl radical in which any or none of the hydrogen atoms are substituted by non-metallic elements or radicals, which when present in the said R-Hg-X compound will not react with either alkalies or acids to form salts, and wherein X represents an element or radical which exists as an anion when the compound is dissolved in water.

In case the benzene ring has no other substitutions, the compounds is a phenylmercuric compound having the formula $C_6H_5HgX$, X being an anion. In this application, unless otherwise stated, the term "phenylmercuric compound" means $C_6H_5HgX$, X being an anion, and the term "phenylmercuric radical" or "phenylmercuric ion" means $C_6H_5Hg+$. Certain germicidal preparations of this type are described in my co-pending applications, Serial No. 625,657, filed July 29, 1932, and Serial No. 736,105, filed July 19, 1934, of which applications this is a continuation-in-part. I have also found that certain substituted phenylmercuric compounds have great usefulness as germicidal and antiseptic preparations. By "substituted phenylmercuric compounds" I mean phenylmercuric compounds in which one or more of the remaining hydrogen atoms in the benzene ring is replaced by another element or group. Among the groups that may be advantageously substituted in the benzene ring are halogen, nitro, methyl and other hydrocarbon groups. Salt forming or solubilizing groups, such as the hydroxyl, carboxyl, sulfonic, amino and dimethyl-amino groups, either in the free state or as salts, attached directly to the benzene nucleus, greatly change the character of the compounds. Such solubilizing groups are not included as substituents in the phenylmercuric radical of the compounds of the present invention. It is however, within the scope of the invention to include compounds containing these groups in some part of the molecule other than as substituents in the phenylmercuric radical. Thus, p-tolylmercuric salicylate, having the formula:

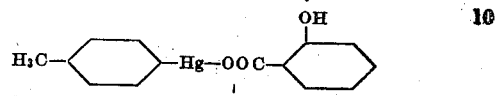

is included, there being no salt forming groups as a substituent in the phenylmercuric radical. Also, compounds having more than one hydrogen atom replaced by the same or by different non-salt forming groups in the phenylmercuric radical give satisfactory pharmaceutical preparations; for example, chlornitrophenylmercuric acetate.

Phenylmercuric acetate may be conveniently made by mercurating benzene by means of mercuric acetate in the presence of glacial acetic acid. O-nitro and halogen phenylmercuric acetates may be made in a similar manner from nitrobenzene or halogen benzene, respectively. P-tolylmercuric chloride may be prepared from sodium p-toluene sulfinate and mercuric chloride ("Organic Syntheses, Vol. III, page 99, H. T. Clarke, Editor, John Wiley & Sons 1923"). m- and p-nitrophenylmercuric chloride may be prepared in an analogous way from m- and p-nitrobenzene sulfinic acids, respectively. The Grignard synthesis may also be employed for the preparation of the compounds.

The acetate or chloride may be replaced in these compounds by other anions by double decomposition; for example, phenylmercuric acetate may be reacted with sodium salicylate in water solution, giving a precipitate of the less soluble phenylmercuric salicylate. Also phenylmercuric chloride may be reacted with silver nitrate in alcoholic solutions, giving a solution of phenylmercuric nitrate and a precipitate of silver chloride as a by-product.

As a class, phenylmercuric compounds and substituted phenylmercuric compounds are fairly insoluble in water. Thus, phenylmercuric acetate, which is one of the most soluble, dissolves to the extent of about 0.5 part in 100 parts cold water and of about 4 per cent in boiling water. Phenylmercuric chloride is soluble in about 20,000 parts of water, the bromide to a less extent, and the iodide still less. P-tolylmercuric chloride is soluble to the extent of 1 part in from 20,000 to 30,000 parts of water. Phenylmercuric hydroxide is soluble in somewhat less than 100 parts of water. In solutions having a pH over 9.2, the phenylmercuric compounds are converted to the hydroxide, and consequently, under these conditions, the apparent solubility of any salt is really the solubility of the hydroxide.

Phenylmercuric compounds of the class described, those carrying an anion linked to a benzene nucleus through a mercury atom, are relatively stable in the animal system. In the medical use of these salts, their limited solubility is an advantage, since it enables automatic preparation of solutions which are effectively lethal against bacteria but are not strong enough to be irritant.

I have found that the precipitated product resulting when a saturated solution of phenylmercuric acetate is reacted with a strong aqueous solution of potassium nitrate, has a solubility of an order which makes it quite suitable for the present purpose. The product resulting from this reaction corresponds in its reactions, and the analysis of the product conforms to, a basic nitrate having the formula $(C_6H_5Hg)_2OH.NO_3$, although possibly the composition is an equimolecular mixture of phenylmercuric nitrate and phenylmercuric hydroxide. It is crystallizable and the crystals appear homogeneous, making it probable that it is a compound. This product melts with decomposition at temperatures in the neighborhood of 176°–186° C. This compound is soluble in about 1200 parts of water, and this solution, like many of the phenylmercuric salts, is colorless, almost tasteless and non-corrosive to the heavy metals. It is somewhat more soluble in alcohol, glycerin, diethylene glycol and acetone.

Addition of one mol of nitric acid to an acetone solution of one mol of basic phenylmercuric nitrate gives the normal phenylmercuric nitrate, which can be recrystallized from water to reproduce the basic nitrate.

The choice of the particular phenylmercuric or substituted phenylmercuric compound employed in any given case depends on the circumstances. Each has specific advantages in particular relations and they are powerful germicides, relatively non-toxic to higher animals.

The present investigation has included the preparation of a number of phenylmercuric compounds, including in addition to those already mentioned the propionate, butyrate, picrate, basic picrate, sulfate, carbonate, phosphate, and borate. The centesimal composition has not been determined in all cases and it is possible that some of these compounds have in fact been basic salts. In general they may be prepared by mixing a hot concentrated aqueous solution of a relatively soluble phenylmercuric compound of a relatively strong solution of a salt containing the desired anion, and allowing the less soluble phenylmercuric salt to separate out, then washing and recrystallizing. Non-aqueous solvents may often be employed. Thus, phenylmercuric picrate may be prepared by mixing together 22.9 g. picric acid and 33.6 g. phenylmercuric acetate in 200 cc. hot benzene until a solution is obtained, filtering, cooling, and allowing the phenylmercuric picrate to settle out, washing and recrystallizing from benzene. If the reaction is carried out in water, the basic picrate is formed.

It is, however, important that the compounds be of a high degree of purity. The presence of by-products obtained in the manufacture has been found to cause a marked diminution in germicidal activity, accompanied by increased toxicity toward the higher animals. These by-products, or side products, do not have the particular molecular structure which I have found useful.

I believe these compounds to be the most effective germicides and antiseptics now known to combat bacteria, fungi, and yeasts pathogenic to human beings. To a less extent, they are effective against protozoa.

Using the Reddish technic, the following group of organisms was killed in five minutes by basic phenylmercuric nitrate and phenylmercuric chloride in dilutions of from 1:50,000 to as high as 1:350,000:—Streptococcus hemolyticus, B typhosus, B pyocyaneus, Staphylococcus aureus, Proteus vulgaris, B mucosus capsulatus and B coli. Using the same procedure, p-tolylmercuric chloride killed B coli at a dilution of 1:50,000.

Cultures of Staphylococcus aureus were grown on agar slants for 36 hours and then made into a suspension in physiological saline solution and a standard amount of this suspension was added to a standard amount of the basic phenylmercuric nitrate. Transfers were made to inoculation tubes of broth after 3 minutes, and the tubes were then incubated 48 hours. At a concentration of 1:75,000, the organisms were killed, whereas the control showed $2 \times 10^8$ living organisms per cubic centimeter.

With pathogenic fungi including pathogenic yeasts, basic phenylmercuric nitrate shows remarkable results. For instance, Trichophyton nodoformans after 28 days' incubation, showed no growth in the presence of the compound at a concentration of 1:125,000.

The compounds embraced by this invention are strikingly effective in inhibiting bacterial growth. Thus basic phenylmercuric nitrate was found to inhibit the growth of B coli at a dilution of 1 part in 420,000 and of Staphylococcus aureus at a dilution of 1 part in 12,000,000. Similarly, basic phenylmercuric picrate prevented growth of B coli at a dilution of 1:800,000, and of Staphylococcus aureus at a dilution of 1:6,400,000. Using a different technic, in which a small number of organisms is used, the inhibition figures for basic phenylmercuric nitrate for B coli and Staphylococcus aureus were 1:13,000,000 and 1:500,000,000, respectively.

In testing the bacterial inhibiting power of the compounds in non-aqueous solvents, a small drop of the solution was placed upon an agar plate inoculated with the bacteria. Phenylmercuric salicylate at a dilution of 1:20,000 in olive oil prevented B coli growth over an area of ½ inch, and at a dilution of 1:6,400,000 prevented growth of Staphylococcus aureus over an area of ⅝ inch. A crystal of phenylmercuric bromide applied to the agar plate left a clear space of 1/4 inch in the case of B coli and 1¾ inches with Staphylococcus aureus.

The germicidal effectiveness of phenylmercuric compounds against these organisms is only slightly reduced in the presence of animal tissues.

Phenylmercuric compounds are relatively non-toxic to higher animals. Thus rats, mice and guinea pigs were given saturated solutions of basic phenylmercuric nitrate as their only source of drinking water for periods of from 7 to 18 days. Of the thirty-seven animals subjected to this extremely severe test, twenty-seven appeared normal at the end of the period.

Successive intravenous injections of 5 cc. of a saturated solution of basic phenylmercuric nitrate were administered to rabbits on the first, third and fifth day of a 14 day test. The animals remained normal in every respect throughout the 14 days they were under observation.

Rabbits tolerate 7.5 mg. basic phenylmercuric nitrate per kilo body weight intraperitoneally and about the same dose of p-tolylmercuric chloride.

Phenylmercuric chloride in 10 mg. doses has been administered orally to man thrice daily for repeated periods of weeks without any untoward symptoms. In another test, 250 cc. of the saturated aqueous solution of the basic phenylmercuric nitrate taken orally by a man resulted in no signs of mercury poisoning.

Phenylmercuric compounds may be used in the form of aqueous solutions, with or without the addition of glycerin, alcohol or other agents. In this form, they are valuable antiseptics for application to cuts, wounds or abrasions, or as mouth washes and douches. In a clinical study of 100 cases involving infection of the vagina and cervix, all but two responded favorably to local application and douches of solutions of basic phenylmercuric nitrate. The two excepted cases were infections by the quite resistant protozoon, Trichomonas vaginales. All gonorrheal infections were cured.

The infection in these cases, as is usual, was characterized by living organisms which, except in the case of Trichomonas, were fungi living in close proximity to cells of an animal nature. On applying the solution to the surface, that is, bringing it in contact with both types of cells, the fungi cells and the cells of the living animal tissue, the former were selectively killed, while the animal cells were uninjured. There was but little irritation felt by the patient, and no irritation of a lasting nature was experienced. In other words, an application of the solution to vegetable microorganisms adjacent to animal cells killed the former and did not affect the latter.

Basic phenylmercuric nitrate in olive oil is a particularly valuable therapeutic agent in the treatment of fungus or other germ growths on the skin. Ointments embodying basic phenylmercuric nitrate in an oxycholesterin base have a similar usefulness as evidenced in the unusually successful treatment of tinea and yeast infections of the skin. The microorganisms causing the diseases were destroyed without harmful effects on the patients.

Phenylmercuric compounds are likewise valuable in the treatment of internal infections, which cannot be reached by topical medication, in which cases they are administered by mouth, intravenous injection, etc. Colitis, septicemia, pneumonia, cystitis, biliary infections and other diseases, in which it is difficult or dangerous to reach the foci of infection, have responded favorably to internal administration of phenylmercuric compounds.

Also, diseases which are considered to be due to filterable viruses have been successfully treated by the application of phenylmercuric compounds.

As stated, it is important that the compounds be of a high degree of purity. As an illustration of a method of manufacturing a pharmaceutical preparation within the purview of my invention, one pound of mercuric acetate is added to one pound of hot glacial acetic acid introduced into a pressure flask containing 900 cc. of thiophene-free benzene. The mixture is autoclaved for four hours at a pressure of approximately 6 pounds. The unreacted benzene is distilled off and the reaction mixture cooled to room temperature—say 20° to 25° C. The precipitate which is formed on cooling is separated from the liquid portion by filtration. The filtrate is evaporated to complete dryness. The resulting residue is then introduced into boiling water in which it is largely soluble. The insoluble portion is separated by filtration from the hot water solution and the filtrate allowed to cool to room temperature. Crystals of phenylmercuric acetate form on cooling and are separated by filtration. The phenylmercuric acetate so obtained is redissolved in water and an excess of sodium nitrate is added. A separation of basic phenylmercuric nitrate occurs, which is removed by filtration. A solution of this basic phenylmercuric nitrate, 1 part in 1250 parts of water, is a suitable pharmaceutical preparation.

In event phenylmercuric chloride is made, the phenylmercuric acetate obtained as above described is treated with sodium chloride in aqueous solution.

What I claim is:

1. The method of treating pathogenic germs while they are in contact with tissue of living higher animals for the purpose of rendering the germs innocuous and without harming the animal, which comprises contacting said germs in situ with a solution of a suitable concentration of an organic mercury compound having the formula RHgX 

wherein R represents a phenyl radical carrying no substituent groups which will react with either alkalies or acids to form salts, and wherein X represents an element or radical which exists as an anion when the compound is dissolved in water.

2. The method of claim 1 in which R represents a substituted phenyl radical in which the substituents are selected from the class consisting of halogen, nitro, and hydrocarbon.

3. The method of claim 1 wherein said organic mercury compound is a phenylmercury compound having the formula C₆H₅HgX 

wherein X is an element or radical which exists as an anion when the compound is dissolved in water.

4. The method of claim 1 wherein the organic mercury compound is basic phenylmercuric nitrate.

5. A germicidal preparation for use in suitable concentration in contact with tissue of a living human being or other higher animal for the purpose of combating the attack of pathogenic micro-organisms on said animal, without harming the animal, comprising an organic mercury compound having the formula RHgX 

wherein R represents a phenyl radical carrying no substituent groups which will react with either alkalies or acids to form salts and wherein X represents an element or radical which exists as an anion when the compound is dissolved in water.

6. The germicidal preparation of claim 5 in which R represents a substituted phenyl radical in which the substituents are selected from the class consisting of halogen, nitro, and hydrocarbon.

7. The germicidal preparation of claim 5 wherein said organic mercuric compound is a phenyl mercury compound having the formula $$C_6H_5HgX$$

wherein X is an element or radical which exists as an anion when the compound is dissolved in water.

8. The germicidal preparation of claim 5 wherein said organic mercuric compound is basic phenylmercuric nitrate.

9. As a germicidal preparation for use in contact with tissue of living human beings or other higher animals for the purpose of combating the attack of pathogenic micro-organisms on said animals without harming the animals, said preparation comprising a dilute solution containing the ion $$RHg^+$$

wherein R represents a phenyl radical carrying no substituent groups which will react with either alkalies or acids to form salts, said solution containing a sufficient concentration of said ion to effectively destroy pathogenic germs, the said concentration being insufficient to harm the animal and said concentration being maintained by the relatively limited solubility of the organic mercuric compound present in said solution.

LYLE A. WEED.